United States Patent [19]

Maistrovich

[11] 4,418,098

[45] Nov. 29, 1983

[54] IMAGING MEDIA CAPABLE OF DISPLAYING SHARP INDICIA

[75] Inventor: Anthony R. Maistrovich, Lake Elmo, Minn.

[73] Assignee: Minnesota Mining & Manufacturing Company, St. Paul, Minn.

[21] Appl. No.: 348,653

[22] Filed: Feb. 12, 1982

Related U.S. Application Data

[63] Continuation-in-part of Ser. No. 182,974, Sep. 2, 1980, abandoned.

[51] Int. Cl.[3] .......................... B05D 5/00; B32B 3/26; B41M 5/00

[52] U.S. Cl. .................................... 427/161; 427/146; 427/180; 427/203; 427/245; 427/246; 427/261; 428/195; 428/206; 428/315.9; 428/317.5; 428/317.9; 428/321.1; 428/338

[58] Field of Search ............... 428/317.5, 317.7, 317.9, 428/321.1, 321.3, 195, 206, 315.5, 315.7, 315.9, 317.1, 317.3, 318.4, 338; 427/146, 161, 180, 203, 212, 214, 245, 246, 256, 261

[56] References Cited

U.S. PATENT DOCUMENTS

| | | | |
|---|---|---|---|
| 2,299,991 | 10/1942 | Kallock | 234/74 |
| 2,854,350 | 9/1958 | Phillpotts | 117/36 |
| 3,031,328 | 4/1962 | Larson | 117/36.7 |
| 3,247,006 | 4/1966 | Hoge et al. | 117/36.7 |
| 3,298,895 | 1/1967 | Plambeck, Jr. | 161/160 |
| 3,684,551 | 8/1972 | Seiner | 428/307 |
| 4,064,304 | 12/1977 | Fujita et al. | 428/306 |
| 4,252,601 | 2/1981 | Ceintrey | 156/655 |
| 4,299,880 | 11/1981 | Arens | 428/336 |

FOREIGN PATENT DOCUMENTS

| | | |
|---|---|---|
| 2373120 | 6/1978 | France . |
| 79678 | 5/1978 | Luxembourg . |

OTHER PUBLICATIONS

Ind. Eng. Chem., Prod. Res. Develop., vol. 13, No. 1, 1974, Washington, DC, (U.S.), J. J. Clancy: "Microvoid Coatings in Graphic Arts Applications, A Patent Survey", pp. 30–33.

*Primary Examiner*—Bruce H. Hess
*Attorney, Agent, or Firm*—Donald M. Sell; James A. Smith; Richard E. Brink

[57] ABSTRACT

Improved sheet material of the type where a base sheet is provided with an opaque microvoid-containing layer which can be locally transparentized by applying a colorless liquid which is a non-solvent for the layer. Indicia remain more sharply defined by including in the layer an organic polymer which jellifies in the presence of the liquid and blocks lateral migration.

12 Claims, No Drawings

IMAGING MEDIA CAPABLE OF DISPLAYING SHARP INDICIA

CROSS-REFERENCE TO RELATED CASE

This application is a continuation-in-part of application Ser. No. 182,974, filed Sept. 2, 1980, now abandoned.

BACKGROUND OF THE INVENTION

This invention relates to sheet material, especially a base sheet obscured by an opaque but transparentizable microporous, diffusely light-reflective layer.

For centuries paper has been one of the most versatile substances made by man. Formed from commonly available cellulosic materials, it can be made stiff or flexible, rough or smooth, thick or thin, and provided with any desired color. After it has served its intended purpose, it can often be repulped and used again. In recent years, however, the demands for paper have increased to the extent that it has finally been recognized that the sources of cellulosic raw materials are not inexhaustible. Further, the energy required to manufacture paper is a significant consideration in a world becoming increasingly aware that supplies of energy are also finite. It has also become recognized that, where paper is used as a carrier for inidicia, it can generally be used only once, it being impossible or impractical to remove indicia which are no longer needed or desired. There has thus arisen a desire for a substitute for paper, especially one which can be repeatedly and easily reused; even a substitute which was more expensive to manufacture would be less expensive in the long run if it could be reused a sufficient number of times.

Several U.S. patents (e.g., Kallock U.S. Pat. No. 2,299,991, Larsen U.S. Pat. No. 3,031,328 and Thomas U.S. Pat. No. 3,508,344) disclose composite sheet material wherein a light-colored opaque blushed lacquer layer is coated over a base sheet which is either dark-colored or imprinted with dark-colored indicia. The opacity and light color of the blushed lacquer coating are due to the inclusion of numerous microvoids; the local application of (1) heat or pressure (either of which irreversibly collapses the microvoids) or (2) a non-solvent liquid having substantially the same refractive index as the lacquer (which fills the microvoids), causes the coating to become selectively transparent and the underlying dark backing to become visible. A non-solvent liquid employed to impart transparency to the opaque microporous layer can subsequently be evaporated to restore the original appearance. A liquid which was a solvent for the lacquer coating would, of course, result in permanent transparency by collapsing the microvoids.

Phillpotts U.S. Pat. No. 2,854,350 describes structures which are functionally similar to those just described, except that the blushed lacquer coatings are replaced by a microporous layer of finely divided calcium carbonate in an organic binder. Transparency is imparted by locally applying pressure or treating selected areas with a wax, oil or grease having a refractive index similar to that of the calcium carbonate. Other pigments may be incorporated in a microporous highly plasticized resin binder; see Hoge et al. U.S. Pat. No. 3,247,006.

It is sometimes desirable to have microvoid-containing sheet material which can be transparentized by applying a liquid, but which cannot readily be transparentized by the application of heat or pressure. In such circumstances, a microvoid-containing layer of the type described in Arens U.S. Pat. No. 4,299,880, owned by applicant's assignee, is preferred. This patent discloses a structure in which the microvoid-containing layer consists essentially of particles held in pseudo-sintered juxtaposition by a thermoset binder and has a cohesion value of at least 400 grams force*.

*The cohesion value is determined by knife-coating a dispersion of a putative composition on a cleaned gray cold rolled steel panel, drying and curing as appropriate for the composition, to provide a coating 50–60 micrometers thick. Using a "Balance Beam Scrape-Adhesion and Mar Tester", sold by Gardner Laboratories, Inc., Bethesda, Maryland, a sapphire-tipped stylus is lowered into contact with the test panel and held in fixed position while a ball bearing-supported platform moves the panel. The minimum grams-force required to form a 50-micrometer deep scratch in the coating in a single pass is determined at a magnification of 40× and reported as cohesive value.

To a greater or lesser extent, each of the products described in the preceding paragraphs suffers from the disadvantage that localized application of a transparentizing liquid results in an image which does not maintain its original sharp outlines with the passage of time. In other words, there is a tendency for the marking liquid not only to penetrate the microvoids perpendicularly to the surface but also to wick laterally. As a result, the longer the transparentizing liquid remains in contact with the microvoid-containing layer, the less distinct the original image. In some instances, it becomes difficult to distinguish similar numerals (e.g., 6, 8 and 9) or letters (e.g., l, i and t) from each other. Prior to the present invention, no way of combatting this problem was known.

BRIEF DESCRIPTION

The present invention, then, provides an improved sheet material of the type wherein a base sheet is coated on at least one face with an opaque white or pastel layer comprising a film-forming polymer containing interconnected microvoids. The sheet material can be made to display contrasting indicia by applying to the exposed surface a desired pattern of a colorless, transparent marking liquid which is a non-solvent for the film-forming polymer and which has a refractive index approximating that of the constituents of the layer, thereby rendering the marked portions transparent. The marking liquid for these conventional products is selected on the basis that it will neither dissolve nor react with the constituents of the layer and has a volatility suited to the desired end use.

The improvement provided by the present invention comprises, incorporated into the microvoid-containing layer, a substance (typically an organic polymer) which significantly increases the viscosity of the marking liquid. (For convenience, this thickening action is referred to herein as "jellification.") When applied to the surface of the microvoid layer the marking liquid penetrates into the layer and then thickens, or gels, when it contacts the jellifying substance, its viscosity becoming so high that it retards passage of the marking liquid through the microvoids, i.e., inhibiting lateral wicking. While it might be anticipated that vertical penetration of the microvoids would be likewise inhibited, so that transparentization would not occur, such is surprisingly not the case. As a result, indicia can be readily generated but nevertheless maintain substantially the same dimensions throughout the time that the layer is locally transparentized.

The jellifying substance employed in the practice of the invention can be either natural or synthetic but is characterized by the property of jellifying the marking liquid employed. A simple test for determining whether a given substance is suitable for use with a specific marking liquid involves placing 10 grams of the putative jellifying substance and 90 grams of marking liquid in a 500-cc glass jar, tightly capping the jar, and tumbling it for 24 hours. If the substance and marking liquid have formed a homogeneous gelatinous ball with no liquid remaining, the combination is deemed suitable for use in practice of the invention.

To determine whether a given jellifying substance-marking liquid combination will probably be effective in practicing the invention, it has been found useful to consider their respective solubility parameters, δ(measured in hildebrands).* Generally speaking, if the solubility parameters of the jellifying substance and the marking liquid differ by approximately 2 hildebrands, the combination is likely to be effective in practice of the present invention; smaller differences tend to result in lower solution viscosities, and greater differences tend to result in insufficient gelling to inhibit lateral wicking.

*Detailed discussions of solubility parameters, their measurement and calculation are found in (1) *Encyclopedia of Polymer Science and Technology*, Interscience, New York (1965), Vol. 3, page 833 et seq., and (2) *Encyclopedia of Chemical Technology*, Interscience, New York, (1971), Supplement Vol, page 889 et seq.)

PRESENTLY PREFERRED EMBODIMENTS

Understanding of the invention will be further enhanced by referring to the following illustrative but non-limitative examples, in which all parts, ratios and percentages are by weight unless otherwise noted.

EXAMPLE 1

Following the general procedure described in Phillpotts U.S. Pat. No. 2,854,350, a control was prepared by placing 39.6 grams of water, 0.4 gram sodium alginate and 5 grams precipitated calcium carbonate in a 4-ounce (approximately 125-cc) jar and ball milling for several days. The resulting composition was knife-coated, at a thickness of approximately 200 micrometers, onto the surface of black 60-micrometer greaseproof paper and allowed to dry at room temperature overnight; the dried coating was approximately 25 micrometers thick.

In accordance with the invention, a sample was prepared which was identical to the control except that 0.2 gram cellulose acetate butyrate (CAB 500-1 available from Eastman Chemical Products, Inc.) was included in the composition. Using a felt-tipped pen filled with diethylphthalate (which is a non-solvent for sodium alginate), a 1.5-mm line was stroked on the surface of each of the two products. The table below shows the width of the stroked lines, measured after various time intervals.

| | Image width, mm | |
|---|---|---|
| Time, min. | Control | Example 1 |
| 0 | 1.5 | 1.5 |
| 2 | 1.9 | 1.5 |
| 4 | 2.2 | 1.5 |
| 8 | 3.2 | 1.5 |
| 12 | 3.2 | 1.5 |
| 16 | 3.2 | 1.5 |

It will be observed that the control product suffered from lateral wicking which more than doubled the width of the initial line; in contrast, the Example 1 product maintained a substantially constant line width, the diethylphthalate gelling when it contacted the cellulose acetate butyrate, preventing lateral wicking.

EXAMPLE 2

Following the general procedure described in Thomas U.S. Pat. No. 3,508,344, a control was prepared by placing 75.1 grams acetone, 6.6 grams polymethyl methacrylate ("Elvacite" 2041 available from E. I. duPont de Nemours & Company), 1.6 grams diethylphthalate, 1.1 grams polyacrylate ("Rhoplex" B-15, available from Rohm & Haas Company) and 11.0 grams of water in an 8-ounce (approximately 250-cc) jar and ball milling overnight. The resulting composition was knife-coated, onto the black greaseproof paper used in Example 1 and allowed to dry at room temperature to leave a coating approximately 50 micrometers thick.

In accordance with the present invention, a sample was prepared which was identical to the control except that 1.0 gram methyl cellulose ("Methocel" MC 4000 cp, available from the Dow Chemical Company) was incorporated in the composition prior to ball milling. Using a felt-tipped pen filled with 1,2-propanediol (which is a non-solvent for polymethyl methacrylate, diethylphthalate, and polyacrylate), 0.9-mm lines were drawn on the surface of each product and measured after various time intervals. Results are shown below:

| | Image width, mm | |
|---|---|---|
| Time, min. | Control | Example 2 |
| 0 | 0.9 | 0.9 |
| 1 | 1.2 | 1.0 |
| 5 | 1.2 | 1.0 |
| 10 | 1.2 | 0.9 |

While not so striking as the results shown in Example 1, the results of this example nevertheless show that the construction of the present invention, where the 1,2-propanediol was jellified by the methyl cellulose and prevented lateral wicking, maintained a significantly sharper image than did the control.

EXAMPLE 3

Following the procedure described in more detail in Arens U.S. Pat. No. 4,299,880 a control coating composition was prepared by mixing 16 parts xylene, 16 parts diisobutyl ketone, 8 parts heptane, 11.39 parts thermosetting acrylic resin (G-CURE 868 RX-60, available from Henkel Corporation), 0.2 part di(dioctyl pyrophosphato) ethylene titanate (KR-238S, available from Kenrich Petrochemicals Inc.), 100 parts calcium carbonate having a 0.5–15 micrometer particle size, and 2.17 parts "Desmodur" N-75 (75% solid solution in 1:1 xylene:2-ethoxyethyl acetate of the high molecular weight biuret of 1,6-hexamethylene diisocyanate, having an equivalent weight of 195, available from Mobay Chemical Corporation). The composition was coated on the black greaseproof paper of Example 1 and cured 30 minutes at approximately 90° C. to leave a dried coating approximately 25 micrometers thick.

In accordance with the present invention a product was prepared which was identical to that of the control except that 4 parts of carboxypolymethylene ("Carbopol" 941, available from B. F. Goodrich Chemical Co.) was included in the coating composition. A felt-tipped pen filled with tetraethylene glycol, a non-solvent for thermoset acrylic resin, was then used to mark a 1.0-mm line on the surface of each sheet. After 30 minutes, the line width on the control product was 1.9 mm, while the line width on the product of this Example 3 was only 1.1 mm.

EXAMPLE 4

A microvoid-forming control coating composition was prepared by mixing together 20 grams xylene, 7.6 grams methylisobutyl ketone, 7.6 grams ethylene glycol monoethylether acetate, 0.2 gram di(dioctylpyrophosphato) ethylene titanate, 13.0 grams thermosetting acrylic resin, 100.0 grams 0.5–15 micrometer calcium carbonate, and 2.5 grams "Desmodur" N-75. The composition was coated on the black greaseproof paper of Example 1 and cured by heating 45 minutes at approximately 90° C.

In accordance with the present invention, a coating composition was prepared which was identical to that of the control except that 2 grams of "Kraton" 1107 (isoprene:styrene:isoprene block copolymer, having a 25% toluene solution viscosity at 23° C. of 1.6 Pa.s) was included in the coating composition. A felt-tipped pen containing a mixture of saturated branched chain hydrocarbons (none constituting a solvent for thermoset acrylic resin), having a distillation range of 244°–286° C., was then used to mark lines on both the control and Example 4 products, the width being measured after various time intervals. Results are tabulated below:

| | Image width, mm | |
|---|---|---|
| Time, min. | Control | Example 4 |
| 0 | 1.0 | 1.0 |
| 3 | 1.2 | 1.0 |
| 5 | 1.2 | 1.0 |
| 11 | 1.2 | 1.0 |
| 30 | 1.3 | 1.0 |
| 50 | 1.2 | 0.9 |

EXAMPLE 5

A microvoid-forming control composition was prepared by mixing together 8.0 parts of an oil-free thermosetting alkyd resin having an equivalent weight of 400 ("Aroplaz" 6022, available from Ashland Chemical Company), 56.0 parts ethylene glycol monoethylether acetate, 100.0 parts isopropyl triisostearoyl titanate pigment, and 3.8 parts "Desmodur" N-75. The composition was coated on 64-micrometer dark brown greaseproof paper and cured 6 minutes at 230° C. to leave a dry-coating approximately 25 micrometers thick.

In accordance with the present invention, a product was prepared which was identical to the control except that the coating composition also contained 2.0 parts cellulose acetate butyrate and 2.0 parts carboxypolymethylene. A felt-tipped pen containing dibutyl phthalate (a non-solvent for thermoset alkyd resin) was then used to mark a 1.5-mm line on each coated product and the width measured after various time intervals. Results are tabulated below:

| | Image width, mm | |
|---|---|---|
| Time, min. | Control | Example 5 |
| 0 | 1.5 | 1.5 |
| 0.5 | 1.8 | 1.5 |
| 1.0 | 2.0 | 1.5 |
| 2.0 | 2.4 | 1.6 |
| 1440 | 4.1 | 1.6 |

Similar results were obtained using propylene glycol as a marking liquid, except that the marks on both products disappeared by evaporation of the liquid before 1,440 minutes had elapsed.

The preceding examples illustrate the incorporation of a jellifying substance directly into a microvoid-forming coating composition. It is also feasible to posttreat a microvoid coating to introduce a jellifying material into the microvoids, as the following examples illustrate.

EXAMPLE 6

A sample was prepared in substantially the same manner as the control sheet of Example 1. In accordance with the present invention, a portion of this control was coated with a 5% solution of cellulose acetate butyrate in methylisobutyl ketone and all excess wiped from the surface, after which the solvent was allowed to evaporate at room temperature. A felt-tipped pen containing diethylphthalate (a non-solvent for sodium alginate) was stroked across the treated and untreated portions to produce a line which was initially 2 mm wide. After 30 minutes, the line on the untreated portion was 5 mm wide, while the line on the treated portion was still only 2 mm wide. In a similar manner, a felt-tipped pen containing dioctylphthalate was stroked across the treated and untreated portions to produce a line which was initially 1 mm wide. After 13 days, the line on the untreated portion had become so wide that it could no longer be distinguished, while the line on the treated portion was still only 1 mm wide and easily recognized.

EXAMPLE 7

A control sheet substantially identical to the control sheet of Example 2, was prepared. In accordance with the present invention, a portion of this control was then treated with a 2% aqueous solution of methyl cellulose ("Methocel" MC Standard 4000 cps), the excess solution wiped from the surface, and the sample allowed to dry at room temperature. A felt-tipped pen containing 1,2-propanediol was then used to mark a 0.7-mm line on the surface of both the control and the treated material of this Example 7, line width on each being measured after various time intervals. Results are tabulated below:

| | Image width, mm | |
|---|---|---|
| Time, min. | Control | Example 7 |
| 0 | 0.7 | 0.7 |
| 1 | 1.4 | 0.7 |
| 2 | 1.6 | 0.7 |
| 10 | 1.9 | 0.7 |
| 20 | 2.0 | 0.8 |

EXAMPLE 8

Following the procedure described in more detail in U.S. Pat. No. 4,299,880, a control sheet was prepared by mixing 17.5 parts xylene, 17.5 parts methyl ethyl ketone, 100 parts dry ground calcium carbonate having a 0.5–15 micrometer particle size, and 13 parts thermosetting acrylic resin and ball milling the mixture for 2 days. Then 2.5 parts of the high molecular weight biuret of 1,6-hexamethylene diisocyanate was added and ball milling continued for an additional 4 hours. The dispersion was knife-coated onto the black greaseproof paper of Example 1, dried 1 minute at 90° C. and cured 45 minutes at the same temperature to leave a dried coating about 50 micrometers thick. To a portion of the control sheet coated surface there was applied a 5% methyl ethyl ketone solution of cellulose acetate butyrate (Eastman CAB 500-1) and, after the solution had penetrated the surface, the excess was wiped off and the sample allowed to dry at room temperature. A felt-tipped pen containing diethylphthalate (a non-solvent for thermoset acrylic resin) was then used to mark a 1.2-mm line on the surface of both the control and the treated material of this Example 8, line width on each being measured after various time intervals. Results are tabulated below:

| | Image width, mm | |
|---|---|---|
| Time, min. | Control | Example 8 |
| 0 | 1.2 | 1.2 |
| 3 | 1.3 | 1.2 |
| 36 | 1.5 | 1.2 |

As previously indicated, maintaining a sharp, distinct image is highly desirable when the applied indicia are to be read visually. It is perhaps even more critical, however, that the indicia maintain their original dimensions when they are to be scanned by optical character recognition (OCR) or optical mark reading (OMR) devices.

Whether incorporated in the microvoid-forming coating composition or subsequently applied to a microvoid-containing coating, it is preferred that the jellifying substance occupy a minimum of the void-volume. The incorporation of an excessive amount of jellifying substance will reduce the size of the voids to the point where they are unable to scatter white light effectively. While the jellifying substance can occupy up to 50% of the void volume, it is preferred that it occupy 1-10%.

As a general guide to the selection of jellifying agents and marking liquids, which work effectively together, attention is directed to the following illustrative table:

| Marking Liquid | Jellifying Agent |
|---|---|
| Diethyl phthalate | Cellulose acetate butyrate |
| Dibutyl phthalate | " |
| Dioctyl phthalate | " |
| Triacetin | " |
| Esters in general | " |
| Isopropanol | Carboxypolymethylene |
| Water | " |
| Ethyleneglycol | " |
| Tetraethylene glycol | " |
| Glycols and alcohols in general | " |
| Dodecane | Styrene:isoprene:styrene block copolymer |
| Undecane | Styrene:isoprene:styrene block copolymer |
| Octane | Styrene:isoprene:styrene block copolymer |
| Branched and straight chain saturated hydrocarbons in general | Styrene:isoprene:styrene block copolymer |

In most instances, a marking liquid having a desired volatility will be chosen, after which an appropriate jellifying agent will be selected.

The invention having been described and exemplified as above, it will be recognized that numerous variations of coating compositions, marking liquids, etc. are within the ordinary skill of the art.

I claim:

1. In sheet material of the type wherein a base sheet is coated on at least one face with a layer comprising a first organic polymer containing interconnected microvoids, said layer being locally transparentizable to display contrasting indicia when there is applied to its exposed surface a transparent, colorless liquid which has a refractive index similar to that of the solid constituents of the layer but which is a non-solvent for said first polymer, the improvement comprising, incorporated in said layer, a second organic polymer which has a solubility parameter differing from that of the liquid by about 2 hildebrands and which jellifies the liquid, whereby the indicia maintain substantially the same dimensions throughout the time that the layer is locally transparentized.

2. The invention of claim 1 wherein the first organic polymer is thermoset and holds particles in pseudo sintered juxtaposition.

3. The invention of claim 1 or 2 wherein the jellifying substance comprises cellulose acetate butyrate.

4. The invention of claim 1 or 2 wherein the jellifying substance comprises methyl cellulose.

5. The invention of claim 1 or 2 wherein the jellifying substance comprises carboxypolymethylene.

6. The invention of claim 1 or 2 wherein the jellifying substance comprises a styrene:isoprene:styrene block copolymer.

7. A method of making the sheet material of claim 1 comprising incorporating, in an opaque microvoid-containing layer which is locally transparentizable but not dissolved when contacted with a liquid having a refractive index similar to that of the solid constituents of said layer but not being a solvent therefor, an organic polymer which jellifies said liquid and which is different from said other solid substituents.

8. The method of claim 7 wherein, prior to formation of said layer, the jellifying polymer is incorporated in the composition which is used to form the layer.

9. The method of claim 7 wherein, after said layer has been formed, the jellifying polymer is incorporated in said layer.

10. A method of imparting to the sheet material of claim 1 indicia which maintain substantially the same dimensions comprising applying to the surface of said sheet material a transparent, colorless liquid that is a non-solvent for the first organic polymer and that has a solubility parameter differing from that of said second polymer by about 2 hildebrands.

11. The sheet material of claim 1 provided with contrasting indicia that maintain substantially the same dimensions during their period of visibility, said indicia being formed by localized transparentization of the microvoid-containing layer resulting from the presence of a transparent, colorless liquid that is a non-solvent for the solid constituents of the microvoid-containing layer and has a solubility parameter differing from that of the second organic polymer by about 2 hildebrands.

12. Self-supporting sheet material which is substantially insensitive to marking by the localized application of heat or pressure but which is receptive to ink, pencil, crayon or similar markings and which is adapted to being temporarily or permanently provided with markings by the application of a colorless liquid, comprising in combination:

a. a self-supporting base sheet, b. bonded over at least one side of the base sheet, a reflective opaque white to pastel layer having a cohesive value of at least 400 grams and consisting essentially of particles held in pseudo-sintered juxtaposition by a thermoset binder so that interconnected microvoids are present throughout the layer, and c. a jellifying organic polymer other than the binder partially filling said microvoids, whereby, when there are applied to the exposed surface of said layer desired indicia of a marking liquid which has a refractive index approximately that of the particles, a solubility parameter differing from that of said polymer by about 2 hildebrands, is a non-solvent for said binder and is jellified by the jellifying polymer, the liquid not only penetrates the microvoids and is jellified by the jellifying polymer, thereby reducing the reflectivity of the layer in the vicinity of the liquid-penetrated microvoids to impart transparency and maintaining substantially constant dimensions of the indicia throughout the time that the layer is locally transparentized, but also is inhibited from lateral wicking.

* * * * *

UNITED STATES PATENT AND TRADEMARK OFFICE

CERTIFICATE OF CORRECTION

PATENT NO. : 4,418,098

DATED : Nov. 29, 1983

INVENTOR(S) : Anthony R. Maistrovich

It is certified that error appears in the above-identified patent and that said Letters Patent is hereby corrected as shown below:

Col. 8, Claim 11, line 56, before "and" insert -- other than said second organic polymer; and after "of" delete -- the -- and insert "said".

Signed and Sealed this

*Twenty-fifth* Day of *June 1985*

[SEAL]

*Attest:*

DONALD J. QUIGG

*Attesting Officer* *Acting Commissioner of Patents and Trademarks*